United States Patent

Kril

[15] 3,689,891

[45] Sept. 5, 1972

[54] MEMORY SYSTEM

[72] Inventor: Russell S. Kril, Dallas, Tex.

[73] Assignee: Texas Instruments Incorporated, Dallas, Tex.

[22] Filed: Nov. 2, 1970

[21] Appl. No.: 86,245

[52] U.S. Cl. .......... 340/172.5
[51] Int. Cl. .......... G06f 9/00
[58] Field of Search .......... 340/172.5

[56] References Cited

UNITED STATES PATENTS

| | | | |
|---|---|---|---|
| 3,245,049 | 4/1966 | Sakalay | 340/172.5 |
| 3,422,406 | 1/1969 | Stahle | 340/172.5 |
| 3,434,116 | 3/1969 | Anacker | 340/172.5 |

*Primary Examiner*—Raulfe B. Zache
*Attorney*—Harold Levine, James O. Dixon, Andrew M. Hassell, Melvin Sharp, Rene E. Grossman and James T. Comfort

[57] ABSTRACT

A memory system having unusable storage locations relocated on a redundant data surface so that all addressable memory locations may be utilized. Programmable control of the transfer of data storage to the redundant data surface is provided by recording map tracks on the control surface of a separate disc.

9 Claims, 8 Drawing Figures

INVENTOR
Russell S. Kril
BY Richard L Donaldson
ATTORNEY

MEMORY SYSTEM

This invention relates to memory systems and more specifically to the provision of programmable control of a redundant data storage surface upon which unusable data locations of the memory system are relocated.

In data processing systems there is a requirement for bulk data storage apparatus capable of storing a large number of bits of data. For instance, one form of bulk storage device that is suitable for use in many applications is a random access disc storage file. Magnetic discs having storage surfaces covered with magnetic material rotate continuously and are scanned by electro-magnetic data transfer heads adapted to record or read back electromagnetic impulses along a particular storage track on the surface of a disc. In the larger types of disc files each disc having a recording surface may have a plurality of data transfer heads and depending on the type of file these heads may be positionable to a number of different circular tracks on the recording surfaces on the disc file.

A major problem with magnetic disc memory systems results from defective regions of the magnetic coating formed on the surface of the discs. Despite stringent quality requirements that are imposed upon magnetic discs, the possibility remains that a few surface anomalies will be encountered. These surface anomalies manifest themselves as signal dropouts and result in void storage and retrieval results when an attempt is made to utilize these storage locations.

Accordingly an object of the present invention is to provide a storage system wherein all of the addressable locations of the storage system may be utilized.

Another object of the present invention is to provide a storage system having a redundant data storage surface upon which defective storage areas of the storage system may be relocated.

Another object of the present invention is to provide programmable control of a redundant data surface to automatically relocate unusable storage locations of a storage system.

Briefly and in accordance with the present invention, a storage system is provided wherein unusable storage locations are relocated on a redundant data surface. Programmable control of the redundant data surface is provided in one embodiment by recording map tracks on the control surface of a separate disc. The map tracks are scanned during the sector immediately preceding any sector of the disc file in which data transfer is to take place to determine whether any of the data tracks which will be involved in a preselected data transfer contain defective locations. For those tracks containing defective locations, the map logic automatically relocates these defective track or tracks on the redundant surface instead of the data tracks on the addressed data surface.

The novel features believed to be characteristic of this invention are set forth in the appended claims. The invention itself, however, as well as other objects and advantages thereof may best be understood by reference to the following detailed description of illustrative embodiments when read in conjunction with the accompanying drawings in which:

FIG. 1 is a block diagram illustration of a data processing system in which the memory system of the present invention may be utilized;

FIG. 2 pictorially illustrates a disc storage file having 12 data surfaces, a redundant data surface, and a control surface;

Figure 1:
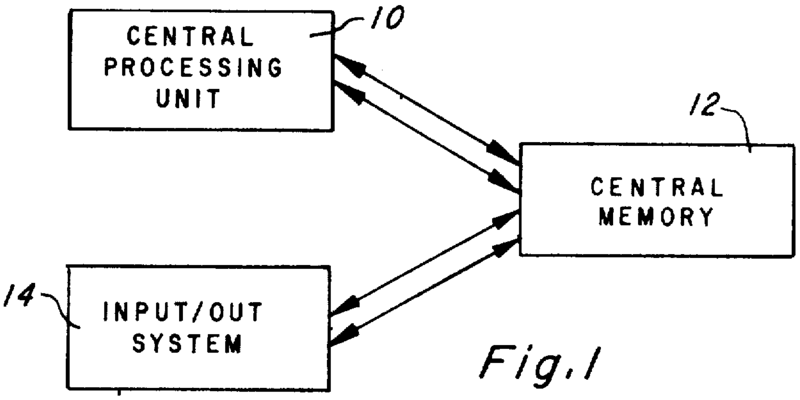

With reference now to the drawings, FIG. 1 depicts a data processing system into which the memory system of the present invention may be incorporated. A central processing unit of a computer is indicated at 10. As understood by those skilled in the art, the central processing unit interprets and executes instructions to the computer. In accomplishing its function, the central processing unit transfers data to and from the central memory 12. The input/output systems of the data processing system are indicated at 14. The input/output systems may comprise conventional displays, tapes, discs, cards, printers, etc. In accordance with the present invention, the central memory 12 may be comprised of a storage system having a redundant data storage surface in accordance with the present invention.

Figure 2:
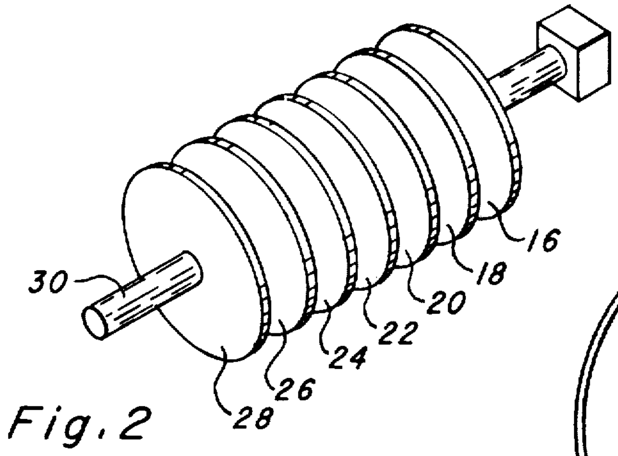

With reference to FIG. 2, there is pictorially depicted a disc file memory system that may be utilized in accordance with one embodiment of the present invention. Other storage means, however, may be utilized. The memory system is shown as comprising six magnetic data storage discs 16, 18, 20, 22, 24, and 26. Each of these conventional magnetic discs defines two planar data storage surfaces. For example, one side of disc 16 comprises one data storage surface and the opposite side of the disc 16 provides a second data storage surface. Thus, a total of 12 data storage surfaces are provided. A control disc 28 is also depicted, one surface of which comprises a redundant data storage surface. A recording of information relative to inoperative locations on the data storage surfaces contained on discs 16–26 is contained in map tracks on the other surface of the control disc 28. The six data discs 16–26 and the control disc 28 are mounted on a shaft 30 which is driven by conventional means (not shown) causing the discs to rotate. Electromagnetic heads (not shown) are positioned adjacent each data surface to effect a transfer of data to and from the data tracks.

Figure 3:
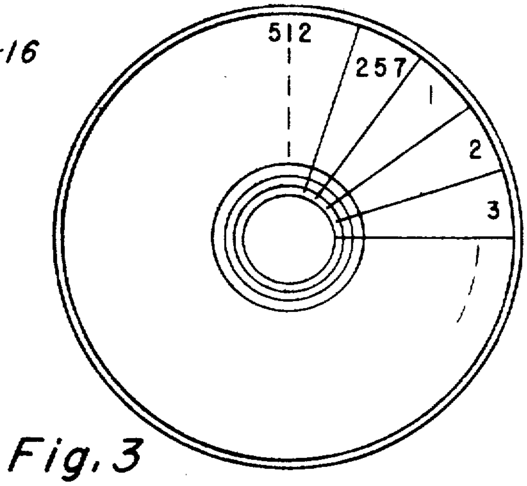
FIG. 3 depicts the data format of a data surface that may be utilized in accordance with one embodiment of the present invention.
Figure 4:
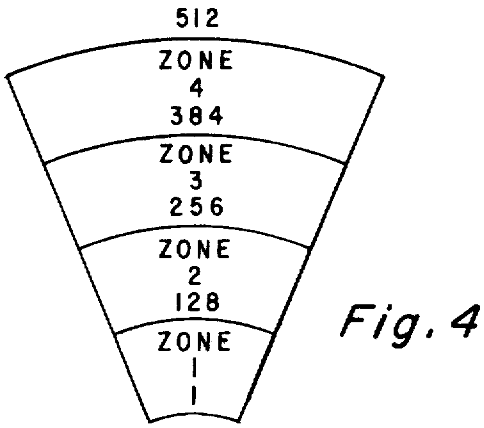
FIG. 4 depicts the data format of a sector of the data surface illustrated in FIG. 3.

FIGS. 3 and 4 depict the organization of data on each data surface. Other storage formats for organization of the data on the storage discs may be utilized as desired. Further, any number of data discs may be utilized depending on the size of the memory required.

With reference now to FIG. 3, a data surface is organized into 512 concentric data tracks. Indicia in each of the 512 data tracks along lines extending radially from the center of the data surface further partition the data surface into 257 wedge-shaped sectors. The magnetic discs 16–28 are aligned so that respective sectors of the data surfaces are simultaneously positioned under the read-write heads. Access to specific locations on the data surface to effect a data transaction is accomplished by specifying which data surface, sector and track is involved. A specific data track within a given sector is referred to hereinafter as a data information segment. For purposes of illustrative embodiment hereinafter described, each data information segment has a storage capability of 512 bits of data.

With reference to FIG. 4, there is depicted an enlarged view of one sector of the data surface shown in FIG. 3 wherein the 512 data tracks are further divided into four zones. Zone 1 comprises data tracks 0–127, zone 2 comprises data tracks 128–255, zone 3 comprises tracks 256–383, and zone 4 comprises tracks 384–511. Each sector is divided into four zones to increase the data transfer rate. Thus, during a data transaction, four tracks (one track from each zone) are operated on simultaneously. Dividing the 512 tracks into zones is a design choice only and is not critical to practicing the present invention.

In accordance with the present invention, data information segments of the disc storage system that contain inoperative locations are relocated to a redundant data surface which is organized in the same format as shown in FIGS. 3 and 4. One surface of the disc 28 may comprise the redundant data surface. The other side of the disc 28 may comprise map tracks containing a recording of information identifying which data information segments of the 12 data surfaces are inoperative and require transfer to the redundant data surface. Alternately, the redundant data surface may occupy portions of both data surfaces of disc 28, if desired. Information recorded on the map tracks of the control disc 28 identifies the operativeness status of each data information segment of a sector. This status is inputted to a logic circuit which effects relocation of defective data information segments to the redundant data surface.

Prior to implementation of the disc file storage system of the present invention in a data processing system such as is shown in FIG. 1, the discs are tested to determine which data information segments are inoperative. Testing means for these purposes are well known in the art. For example, a small general purpose computer may be utilized for this purpose. Once the inoperative data information segments on the 12 data surfaces are identified information defining the status thereof is recorded on the control surface of the disc 28. The testing means to determine inoperative locations may be incorporated as a part of a data processing system and the disc file may be periodically checked to determine whether new locations have become inoperative.

The manner in which the map tracks on the control disc 28 function to relocate inoperative data information segments to the redundant data surface may better be understood by briefly considering a command signal specifying that a data transaction is to take place. The command signal includes information relative to the data surface of the disc file upon which the data transaction is to be effected (one of 12 for the present illustration), the sector (one of 257) and the track (four of 512) that are involved in the data transfer. For example, the command signal may specify that sector N of data surface 3 is to be involved in a selected data transfer. The logic circuits are arranged such that when sector N–1 is positioned under the read-write heads of the memory system, information in sector N–1 of the map track (that is, the control surface of the disc file 28 of FIG. 2) will be read. The information stored therein specifies the operativeness status of the data information segments of sector N of the disc file. As pointed out previously, the sectors of the various discs 16–26 of FIG. 2 are aligned such that sector N will be positioned under the read-write heads on all of the data surfaces at the same time. Thus, the information stored on the map tracks of disc file 28 must specify which data surface, if any, of the 12 surfaces in inoperative. As understood by those skilled in the art, this may be accomplished by binary coding with four bits of information.

In Table 1, four bits of data uniquely define each of the 12 data surfaces.

TABLE 1

| Binary Coding | Surface |
|---|---|
| 0000 | 0 |
| 0001 | 1 |
| 0010 | 2 |
| 0011 | 3 |
| 0100 | 4 |
| 0101 | 5 |
| 0110 | 6 |
| 0111 | 7 |
| 1000 | 8 |
| 1001 | 9 |
| 1010 | 10 |
| 1011 | 11 |
| . | . |
| . | . |
| . | . |
| 1111 | No relocate |

One coding, for example, all binary 1's, may be utilized to specify that none of the 12 surfaces have a defective data information segment at a certain sector and track location. For increased reliability, it is desirable that each code specifying operativeness status be represented twice. Therefore, on a per sector basis, eight bits of data are required for each data information segment. Since there are 512 tracks per sector, 8 × 512 or 4,096 bits of data storage capability are required for the map track on a per sector basis to uniquely define the operativeness status of each of the tracks. Since 512 bits of data can be stored in a data information segment on the map track, eight tracks are required to obtain the 4,096 storage bit capability.

The map track data format on a per sector basis of the control surface of disc 28 of FIG. 2 is shown in Table 2, wherein each map track is divided into four zones, corresponding to the four zones into which each data surface is divided.

Each number in the respective zones corresponds to a data track, that is, one of the 512 tracks on each of the data storage surfaces of the disc files 16–26 of FIG. 2. More specifically, each number has associated with it four bits of data on the map track. For example, with reference to MAP track "0", zone 1, the first four bits of data therein specify the operativeness status of data track "0" of the 12 data surfaces for the sector in question. Similarly, the next four bits of data specify the operativeness status of track "8", etc.. If the 12 data information segments on the 12 surfaces are all operative, the four bits of data contain all binary 1's.

Operation of the map track record and the map logic in automatically relocating inoperative data information segments is initiated by a command signal specifying that a data transaction is to be effected in a preselected location of the disc file system. Eight bits of the command signal specify which of the 257 sectors is to be involved in the data transfer operation.

TABLE 2

| Map track | Data Tracks | |
|---|---|---|
| 0 | 0, 8...120*128–136..243* | 256–264..376*284–392..504* |
| 1 | 1, 9...121*129–137..249* | 257–265..377*385–393..505* |
| 2 | 2, 10..122*130–138..250* | 258–266..378*386–394..506* |
| 3 | 3, 11..123*131–139..251* | 259–267..379*387–395..507* |
| 4 | 4, 12..124*132–140..252* | 260–268..380*388–396..508* |
| 5 | 5, 13..125*133–141..253* | 261–269..381*389–397..509* |
| 6 | 6, 14..126*134–142..254* | 262–270..382*390–398..510* |
| 7 | 7, 15..127*135–143..255* | 263–271..383*391–399..511* |
| | ← 16 → numbers<br>← 64 bits →<br>← Zone 1 → ← Zone 2 →<br>512 bits | ← Zone 3 → ← Zone 4 → |

* Repeats Previous Group

MAP TRACK DATA FORMAT PER SECTOR

Four bits of the command signal identify which of the 12 data surface is involved. Relative to the control disc 28 of FIG. 2, 3 bits of the command signal specify which of the 8 map tracks contains information relative to the status of the data track in question, and 4 bits of the command signal specify which position of the 16 positions in each of the 4 zones contains the operativeness status (reference Table 2). An illustrative example of a typical command signal will serve to better illustrate how information relative to the relocation status of a specific data information segment is obtained. Assume that the command signal is as follows:

Map track: 010

Position: 0111

Such a command would specify map track 2 on the control disc and position 7 within each zone. With reference now to Table 2, it may be seen that map track 2, zone 1 contains 16 positions containing 4 bits of data each. These 16 positions correspond to the operativeness status of respective tracks of the 512 tracks on each data surface, and more specifically to data tracks 2, 10, 18, 26, 34, 42, 50, 58, 66, 74, 82, 90, 98, 106, 114, and 122. The seventh position is track 50. Similarly the 7th position in zone 2 of map track 2 would be data track 178, whereas zone 3 would be data track 306, and in zone 4, the seventh position would be data track 434. Since the map track has redundant data, 8 four-bit numbers will be read (two four-bit numbers for zone 1 and two for zone 2, etc.). If the two numbers in each zone do not match, an error signal is generated.

Assume for purposes of illustration, that track 50 (position 7 of zone 1) contains the following data entered as a result of the diagnostic test prior to implementation of the disc file system:

0011

This binary code, for example, would identify surface 3 of the disc file as having an inoperative track 50 in sector N. The binary code pertains to sector N because the command signal specifies sector N as the sector involved in the data transaction, and the map logic is arranged such that data relative to the status of the data information segments of sector N is stored in sector N–1 of the control disc 28. Thus, a logic decision is made during sector N–1 relative to which data information segments, if any, are required to be relocated so that normal data transfer may be accomplished during sector N.

Again assuming that the information stored in position 7 of zone 1 is 0011, a comparison is made by the map logic with the original command signal which, as explained earlier, specifies the data surface to be involved in the data transfer. If the command signal specified that surface 3, sector N, track 50 was addressed data information segment to be involved in the data transaction, then the comparison with the information stored in position 7 of zone 1 would indicate that the data information segment of surface 3 is inoperative. The logic would then automatically relocate the data information segment on surface 3 to the redundant data surface on the disc 28 (FIG. 2). If, on the other hand, the command signal had specified any of the other 12 surfaces, the comparison would not correlate and the data would be processed on the addressed surface without any relocation.

It is to be appreciated that a comparison also must be made relative to the seventh position of the other 3 zones which are included within the 512 bits of data of map track 2 in order to see if data information segments related thereto require relocation to the redundant surface. Assume, for example, that position 7 of zone 2, which corresponds with track 128 of the respective data surfaces, contains the binary code 1111. This is the code for "no transfer" indicating that all of the data surfaces, sector N, track 128 are operative. It will be appreciated that a decision to relocate a data information segment or to permit the data transaction to be accomplished on the addressed data information segment is required for the indicated position of each of the 4 zones.

Situations may arise during the diagnostic test prior to implementation of the disc file wherein the same data information segment for two separate surfaces is defective. For example, assume sector N, track 18 of surfaces 3 and 7 are both defective. As may be seen, referring to Table 2, in sector N–1 of the map track, information relative to the status of track 18 of sector N is stored in map track 2 of the control surface of disc 28, position 3. As explained earlier, 4 bits of data are stored in position 3 to indicate which data surface, if any, has a bad location in sector N, track 18, and if none, the 4 bits are each logic 1. In the example, however, two surfaces 3 and 7 have bad locations and information relative to both cannot be stored. Therefore, an error signal would result. This situation may be resolved by physically rotating one of the discs containing the data surfaces 3 or 7. For example, the disc containing data surface 7 may be rotated one sector with respect to the other data discs. Assuming that the sector of data surface 7 rotated under the read-write head is operative, only surface 3 now has a defective track 18 in sector N, and this information may be stored on the map logic of the control disc 28 as a 4-bit binary code 0011.

Figures 5, 6:
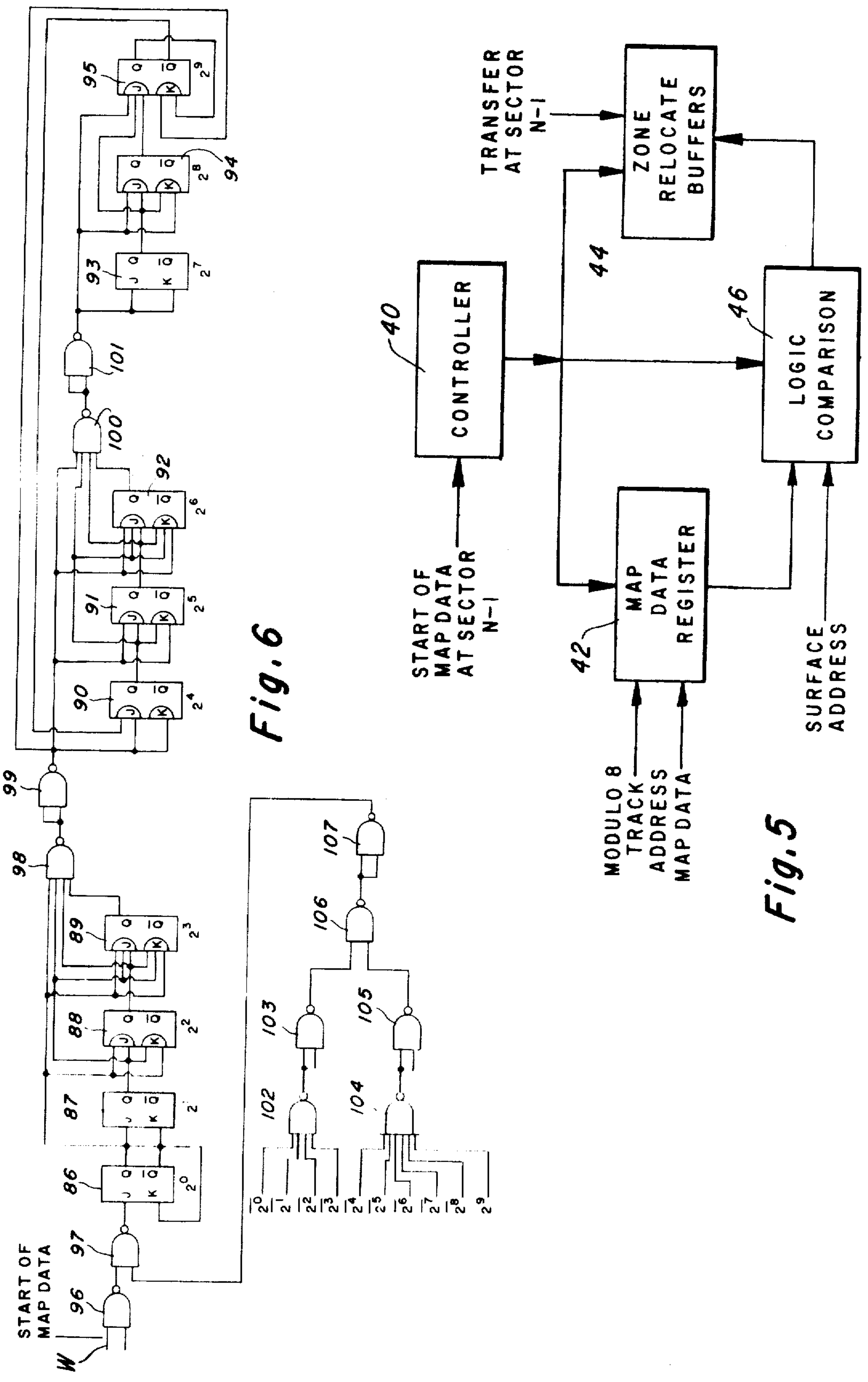
FIG. 5 depicts in functional block diagram format the map logic of the present invention.
FIGS. 6–8 schematically depict logic circuits that may be utilized with the map logic control of the present invention.

With reference to FIG. 5, there is depicted a functional block diagram of the map logic that may be utilized in accordance with the present invention to effect, in response to a signal from the map track of the control surface of disc 28 (FIG. 2), a relocation of inoperative data information segments to the redundant data storage surface. A controller, which may, for example, comprise a binary counter, is shown at 40. A start of map data at sector N–1 signal, for example, from the central processing unit of a computer, forms an input to the controller 40 and initiates operation thereof. One of the functions of the controller 40 is to control read out of the data stored in the respective map tracks. As explained earlier, each map track on the control disc 28 of FIG. 2 has 512 bits of data per sector. Each group of 4 bits of data on the map track contains information relative to the operativeness status of specific data information segment. It may thus be seen that it is essential to maintain selective control of what group of 4-bits of data are being read on a map track at a given time. The controller also functions to provide enable signals to a map data register 42 and to zone relocate buffers 44.

The map data register 42 receives a module 8 of the map track address and map data as inputs. The module 8 track address specifies which position (of 16) within a zone of the map track information is to be found relative to the operativeness status of the data information segment involved in the data transaction. The logic comparator 46 receives which data surface the command signal has identified as being involved in the data transaction. For example, the address could identify that data surface 3 is involved in the data transaction and that information relative to the relocation status of the data information segment in question may be found in, for example, position 2, that is, the second group of four bits of data stored on the appropriate map track of the control disc 28 of FIG. 2. The map data register 42 and the controller 40 provide inputs to the logic comparator 46 wherein a comparison is made between the data surface identified by the command signal as being involved in the data transition and the information contained in the position indicated in the map data register. For example, referring again to Table 2, if map track 2 is being read and the map address specified the information in question was located in position 2, information relative to the operativeness status of data tracks 10, 138, 266, and 394 would be sequentially read during sector N–1. Each of these signals comprises 4 bits of data specifying the data surface, if any, having an inoperative data information segment in sector N. Thus, it may be seen that the logic comparator 46 is required to make 4 logic decisions; that is, a decision relative to each of data tracks 10, 138, 266, and 394. The logic comparator 46 compares the binary 4-bit code read from each zone with the command signal. If the comparison indicates that a data information segment is required to be relocated on the redundant surface, a signal is provided to the zone relocate buffers 44. The zone relocate buffers 44 function to relocate the data information segment associated with a specific zone when that data information segment is identified as being inoperative.

Figure 7:
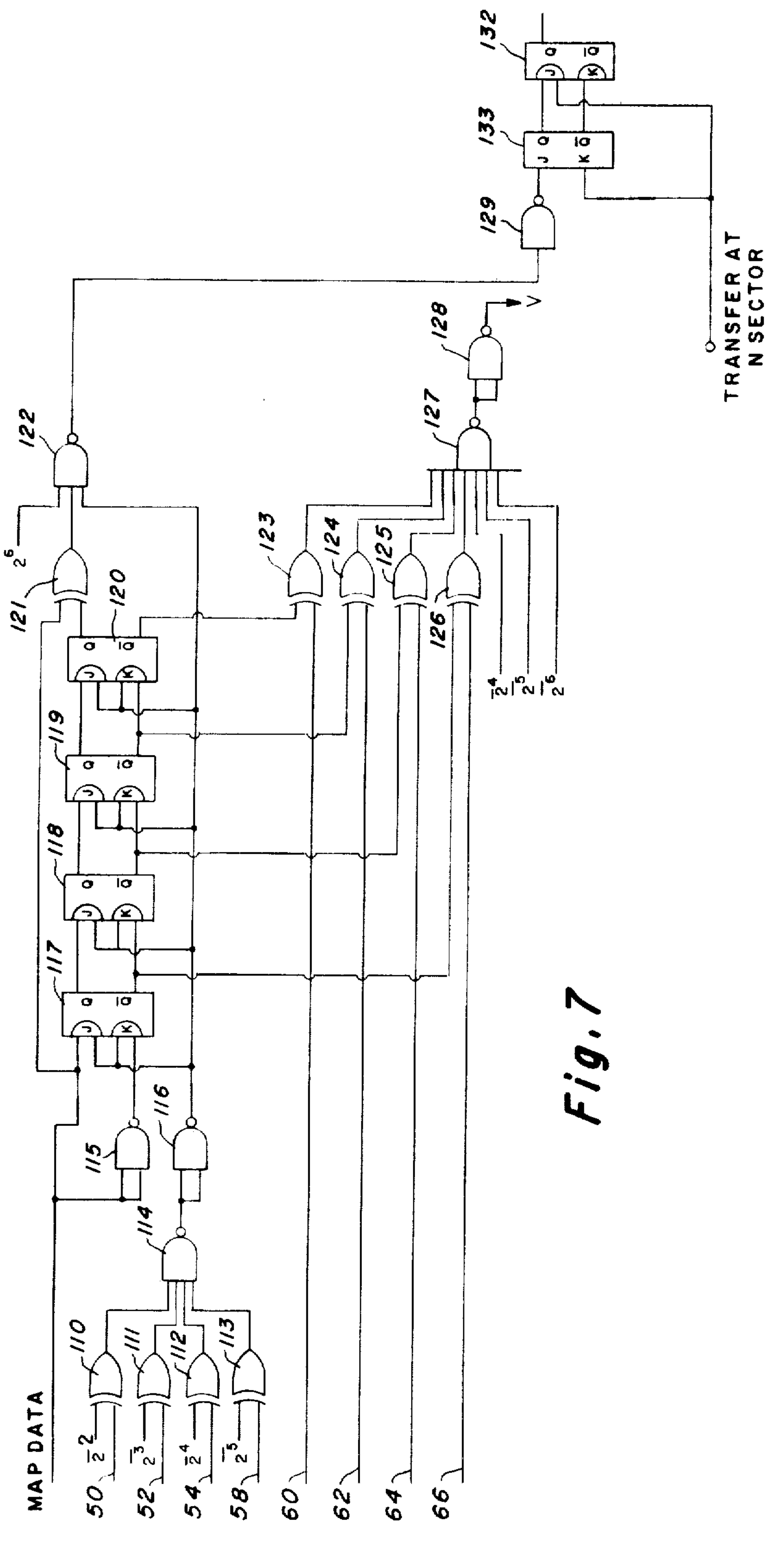
Figure 8:
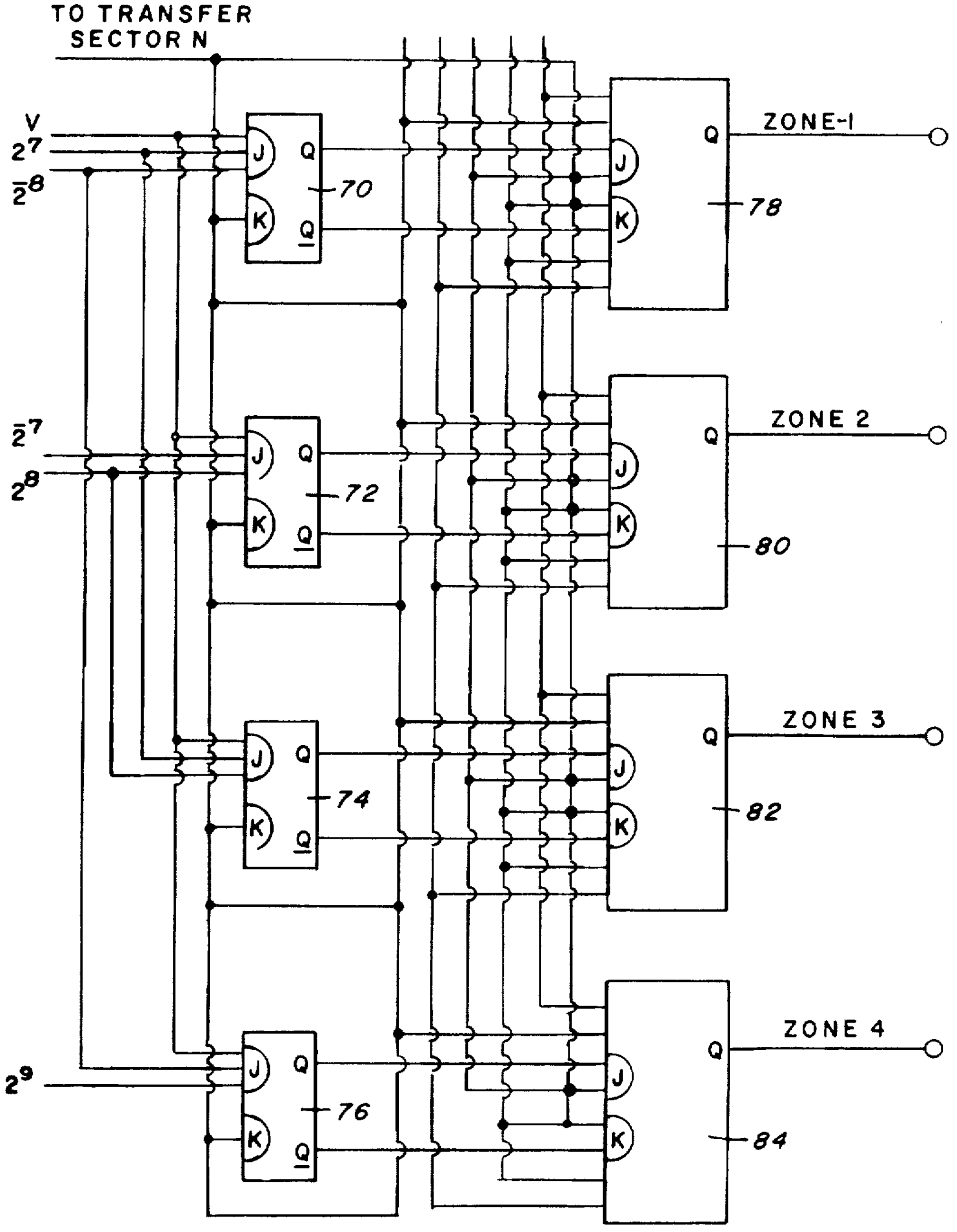

With reference now to FIGS. 6–8, logic circuits are depicted that may be utilized to practice the invention. Flip flops 86–95, in combination with NAND gates 96–101, comprise a binary counter where the state cycles from 0 to 537. The counter is held at a rest state of all flip-flop equal to logic 0. A "start of map data" signal is initiated at sector N–1 via input W at which time the counter unconditionally cycles through 538 states. The decoding of these various states provided the basic control of the map logic. The output of NAND gates 102-107 represents the controller in the all zero or rest state. In the circuit of FIG. 6, 512 of the units relate to data, 16 of the units pertain to a parity check, and 10 units relate to hamming.

The binary counter of FIG. 6 also provides enable signals to the map data register and the logic comparison circuit of FIG. 7 and the zone buffers depicted in FIG. 8.

With reference to FIG. 7, exclusive OR gates 110–113 and NAND gates 114 and 116 establish an enable that is 4 clock units wide that occurs 8 diffeent times during the information data message. The contents of the module 8 track address, applied via leads 50, 52, 54, 56 are compared to the controller bits $2^2$–$2^5$ to establish this enable signal. This establishes which of the 16 numbers of a map data track that will be scanned to determine the operativeness status of a discrete data information signal. Flip-flops 117–120 store the 4-bit binary coding that identifies which data surface, if any, contains an inoperative data information segment for the location in question.

Exclusive OR gates 123–126 and NAND gates 127 and 128 compare the contents of the flip-flops 117–120 to the command address applied to leads 58, 60, 62, 64 thereby effecting a decision to relocate or not to relocate a particular data information segment of a specified data surface. Gate 128 is enabled by a combinational logic $\bar{2}^0 - \bar{2}^6$ to strobe this comparison at the end of each zone time, that is, four times during a message.

Flip-flop 133 and exclusive OR gates 121, and NAND gates 122 and 129 effect a comparison of successive 4-bit data units of the map track (Reference Table 2). When the comparison does not correlate a hardware failure occurs. This is indicated by a signal from the output of flip-flop 132. Control signal $2^6$ applied to NAND gate 122 sets up the enable for this comparison.

With reference to FIG. 8, the output of gate 128 (FIG. 7) is the composite of relocation information for all four zones of a sector. This information is ANDed with the $2^7$ and $2^8$ combinations of the controller by flip-flops 70, 72, 74, and 76 to separate information relative to the respective zones. Flip-flops 70–76 are sampled during sector N–1. The contents of flip-flops 70–76 are transferred into corresponding flip-flops 78, 80, 82, 84 during sector N to effect relocation of specific data information segments.

Although specific embodiments of the present invention have been described herein, it will be apparent to a person skilled in the art that various modifications to the details of construction shown and described may be made without departing from the scope of the invention.

What is claimed is:

1. A memory system comprising in combination:

a. data storage means having predetermined addressable storage locations operable to store data;

b. control means for mapping inoperative storage locations in said data storage means;

c. redundant data storage means; and d. logic means responsive to said mapping control means for relocating addressed inoperative storage locations from said data storage means to said redundant data storage capability.

2. A memory system as set forth in claim 1 wherein said data storage means comprises a magnetic disc file. k 3. A memory system comprising in combination:

a. a rotating magnetic disc file comprising a plurality of planar surfaces adapted to storing data, each of said surfaces being partitioned into a plurality of concentric data tracks and into a plurality of wedge-shaped sectors, a data track within a sector defining a data information segment;

b. a redundant data storage surface for receiving data addressed to inoperative data information segments of said disc file; and c. control means for automatically relocating identified inoperative data information segments to said redundant data surface thereby providing a memory system wherein all addressable memory locations may be utilized.

4. A memory system as set forth in claim 3 including a control data surface, said control means including means for recording of information on control data surface indicating the operativeness status of each data information segment within a selected sector of said disc file and a logic circuit operative to relocate to said redundant data surface data information segments identified as inoperative.

5. A memory system as set forth in claim 4 wherein said control data surface said redundant data surface comprise respective planar data surfaces of a magnetic disc.

6. A memory system as set forth in claim 4 wherein said logic circuit includes means for controlling the selection of data to be read from said control data surface, status means for determining the operativeness status of addressed data information segments and means responsive to data selection means and said status means for relocating inoperative addressed data information segments to said redundant data storage surface.

7. A memory system as set forth in claim 6 wherein said means for controlling the selection of data to be read from said control data surface comprises a binary counter.

8. A memory system in which all addressable locations may be utilized comprising in combination:

a. at least one rotating magnetic disc data storage element having a planar surface on at least one side thereof adapted for storing data, said surface being defined by a plurality of concentric data tracks and being further defined by a plurality of sectors, the sides thereof being defined by indicia in each of the concentric tracks along a pair of lines extending radically from the center of said surface, each data track within the confines of a sector defining a data information segment, certain identified data information segments of said memory system possessing defects that prevent data from being stored therein;

b. a rotating control disc file having a planar surface on one side thereof adapted for storing data, said surface being partitioned into sectors and concentric data tracks, respective sectors of said surface of said control file being aligned with corresponding sectors of said surface of said at least one data storage element, said surface of said control file providing a redundant data storage surface upon which data that has been addressed to inoperative data information segments of said data storage element may be relocated, the other planar surface of said control file also being partitioned into sectors and data tracks and being adapted for storing data relative to the operativeness status of each data information segment of said at least one data storage element;

c. means for transferring data to and from selected data information segments on said at least one data storage element and said control file; and d. logic means electrically connected to said other surface of said control file, said logic means being operative using said transfer means to automatically relocate on said redundant storage surface all data information segments of said at least one data storage element indicated as being inoperative by the information stored on said other surface of said control file, thereby providing a memory system wherein all addressable data information segments may be utilized for data transactions.

9. A method of operating a magnetic disc file memory system wherein all addressable memory locations may be utilized comprising the steps of:

a. testing said disc file system to determine inoperative data information segments for each sector of said disc file system;

b. recording the status of each data information segment of sector N of said disc file in sector N–1 of a control disc;

c. reading the contents of sector N–1 of said control disc prior to a data transfer involving sector N of said disc file system to thereby determine the operativeness status of discrete information segments in sector N of said disc file system that are involved in a selected data transaction; and d. relocating on a redundant data surface each inoperative data information segment of sector N of said disc file system that is involved in said data transaction.

* * * * *